US006473185B2

(12) United States Patent
Vishnia et al.

(10) Patent No.: US 6,473,185 B2
(45) Date of Patent: Oct. 29, 2002

(54) ALIGNMENT FREE INTERFEROMETER AND ALIGNMENT FREE METHOD OF PROFILING OBJECT SURFACES

(75) Inventors: Itai Vishnia, Wantagh; Zvi Bleier, Centerport, both of NY (US)

(73) Assignee: Plx, Inc., Deer Park, NY (US)

( * ) Notice: Subject to any disclaimer, the term of this patent is extended or adjusted under 35 U.S.C. 154(b) by 42 days.

(21) Appl. No.: 09/800,994

(22) Filed: Mar. 7, 2001

(65) Prior Publication Data

US 2002/0126294 A1 Sep. 12, 2002

(51) Int. Cl.[7] .................................................. G01C 9/02
(52) U.S. Cl. ........................................ 356/512; 356/514
(58) Field of Search .............................. 356/511, 512, 356/513, 514, 495, 489

(56) References Cited

U.S. PATENT DOCUMENTS

| 3,844,660 A | | 10/1974 | Hunter | |
| 4,820,049 A | | 4/1989 | Biegen | |
| 4,881,816 A | | 11/1989 | Zanoni | |
| 5,418,612 A | * | 5/1995 | Khopov | 356/512 |
| 5,526,116 A | | 6/1996 | DeGroot | |
| 5,671,050 A | | 9/1997 | DeGroot | |
| 5,721,616 A | | 2/1998 | Domenicali | |
| 5,898,495 A | * | 4/1999 | Manning | 356/452 |
| 6,141,101 A | * | 10/2000 | Bleier et al. | 356/451 |

OTHER PUBLICATIONS

"Optical Shop Testing", John Wiley & Sons, Inc. 1978, Chapters 1 and 2.

* cited by examiner

Primary Examiner—Samuel A. Turner
(74) Attorney, Agent, or Firm—Michael R. Gilman; Kaplan & Gilman, LLP

(57) ABSTRACT

An improved method and apparatus for profiling surfaces is provided. The subject apparatus avoids the earlier used constructions of such apparatus in the normally used Fizeau interferometer form, and instead uses a retroreflector (200) located at the end of the optical path (128) of the beam reflecting off of the surface under test (150) in order to achieve alignment-free surface profiling. In addition, in a second embodiment, a second retroreflector (140') is used to assure a more accurate result. While in yet another improvement, the retroreflector (200) is selectively moveable in relation to the optical path of the beam, to compensate and correct for a shearing effect resulting from the use of variously sized (thicknesses) flats under test.

42 Claims, 5 Drawing Sheets

ALIGNMENT FREE INTERFEROMETER AND ALIGNMENT FREE METHOD OF PROFILING OBJECT SURFACES

BACKGROUND OF THE INVENTION

This invention relates to the field of optical assemblies, and more particularly, to interferometers for surface profiling, wherein the interferometer does not have to be manually aligned in order to achieve the profiling result.

Interferometers are old in the art. Interferometers are widely used in making accurate measurements of radiation spectra, distance measuring, equipment calibration and surface topography mapping.

Leading devices in the surface topography mapping field emanate from Zygo Corporation, of Middlefield Conn. Some basic U.S. patents directed to this inventive area, and owned by Zygo, include U.S. Pat. No. 3,844,660, issued Oct. 29, 1974 to Hunter, entitled METHOD AND APPARATUS FOR ALIGNING AN INTERFEROMETER MIRROR and U.S. Pat. No. 5,671,050, issued Sep. 23, 1997 to de Groot, entitled METHOD AND APPARATUS FOR PROFILING SURFACES USING DIFRACTIVE OPTICS The prior art surface topography measuring devices use a Fizeau interferometer structure. Such a structure is shown in FIG. 1 of this document. The Fizeau interferometer creates an interference pattern between light beams reflecting off of a reference flat and a flat under test, wherein the two flats are parallel planes having an air gap (wedge) there between. The parallelism between the two flats, insures that the path taken by the light beam emanating from the light source will be identical for both flats (i.e., the beams reflecting off of both flats will overlap). Therefore, in order to create an interference pattern on a detector also found in the path of the beam, a parallelism between the two flats is needed. Essentially, a Fizeau interferometer functions by sending a beam of light, preferably a monochromatic (laser) beam of light, through a collimating lens, so as to align the beam for perpendicular translation and reflection off of the reference flat and the flat under test. The beams coming back off of the two flats then retranslate through the collimating lens to a beamsplitter, which reflects part of the beams to the detector. It is at the detector where the fringes are observed.

An interferometer surface topography apparatus directs the beams from the beamsplitter onto some type of conventional camera so as to produce an electronic image on a monitor for viewing of the surface topography of the tested flat.

Use of a Fizeau interferometer in these types of instruments has two major setbacks: (1) a fringe pattern of interference does not automatically appear, requiring manual manipulation (usually of the test flat); and (2) the instrument needs to be mounted on a vibration-isolated platform. The alignment process is time consuming and at times tedious, while the vibration-isolated platform is extremely costly.

Accordingly, it would be desirable to provide an alignment-free interferometer method and apparatus, which is not affected by vibration, in order to obtain surface typographies of flats under test.

SUMMARY OF THE INVENTION

In accordance with the invention, an improved method and apparatus for profiling surfaces is provided. The subject apparatus in addition to using a different construction then that of the normally used Fizeau interferometer, has the added inventive feature of the use of a retroreflector located at the end of the optical path of the beam reflecting off of the surface under test.

Accordingly, it is an object of the invention to provide an improved method and apparatus for profiling surfaces.

Still another object of the invention is to provide an improved method and apparatus for profiling surfaces not using a Fizeau interferometer structure.

Yet another object of the invention is to provide an improved method and apparatus for profiling surfaces, incorporating the use of a retroreflector assembly at the end of the optical path of the beam of light reflecting from the test object.

Other objects of the invention will in part be the obvious and will in part be apparent from the following description.

The invention accordingly comprises assemblies and methods of operation possessing the features, properties, relation of components and steps which will be exemplified in the products and methods hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
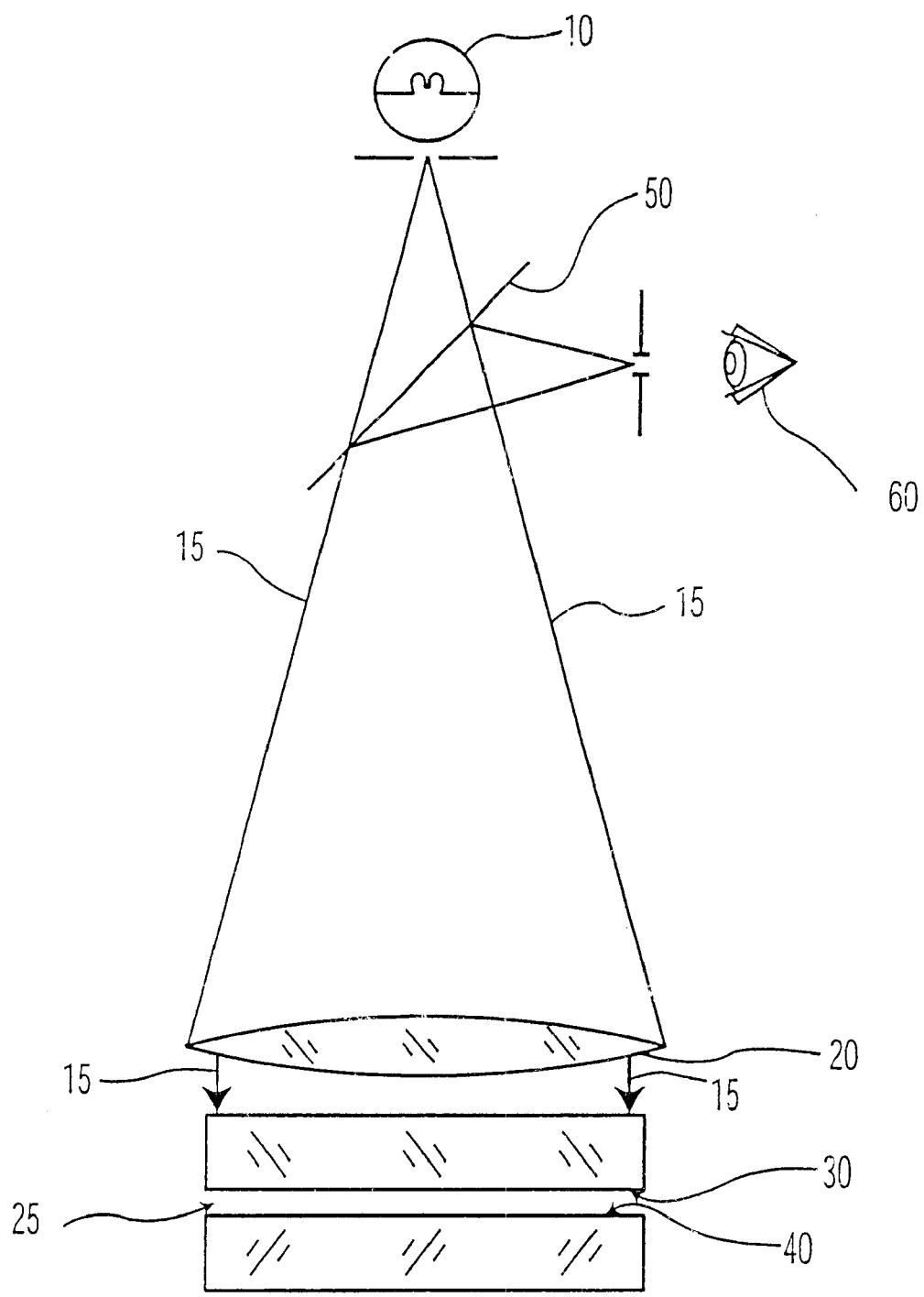
FIG. 1 is a diagram showing how radiation is reflected in a prior art Fizeau interferometer.

Referring first to FIG. 1, a standard Fizeau interferometer is shown. Such a Fizeau interferometer consists of a light source 10, a collimating lens 20, a reference flat 30, a surface under test 40, a beamsplitter 50 and a detector (seen in FIG. 1 to be a person's eye) 60. If light source 10 is a laser light source, then detector 60 should not be a person's eye, as such laser light might injure the person's eye.

Essentially, a Fizeau interferometer as shown in FIG. 1 functions by sending a beam of light 15 (preferably a monochromatic laser beam of light), through collimating lens 20. Collimating lens 20 aligns the multitude of rays making up beam 15 in a manner so that each ray is parallel to every other ray. Beam 15 then passes through reference flat 30 and then air gap (wedge) 25 to reflect off of flat under test 40.

Accordingly, beam 15 in part reflects back toward light source 10 from reference flat 30, and reflects back toward light source 10 from flat under test 40, so the two reflected wavefronts interfere with each other. The interfering wavefronts reflect off of beamsplitter 50 toward detector 60, and at detector 60 fringes are observed.

In order for a Fizeau interferometer to function, thereby creating fringes at a detector, reference flat 30 and flat under test 40 must be essentially parallel to each other and there preferably should be at least a small air gap 25 between these flats, to create the interference between the two wavefronts.

In practice, when a Fizeau interferometer structure is used to obtain surface topography of surface under test 40, the object containing surface 40 is placed into the Fizeau structure, and the object containing surface 40 is then manually manipulated (or the apparatus upon which the object has been placed, is manually manipulated), until fringes appear on the detector. Once fringes have appeared, it is important that surface 40 be maintained substantially perpendicular to the beam 15 and parallel to reference flat 30, thereby resulting in the fringes, and so mounting of that object upon a vibration-isolated platform (not shown) is also important.

Figure 2:
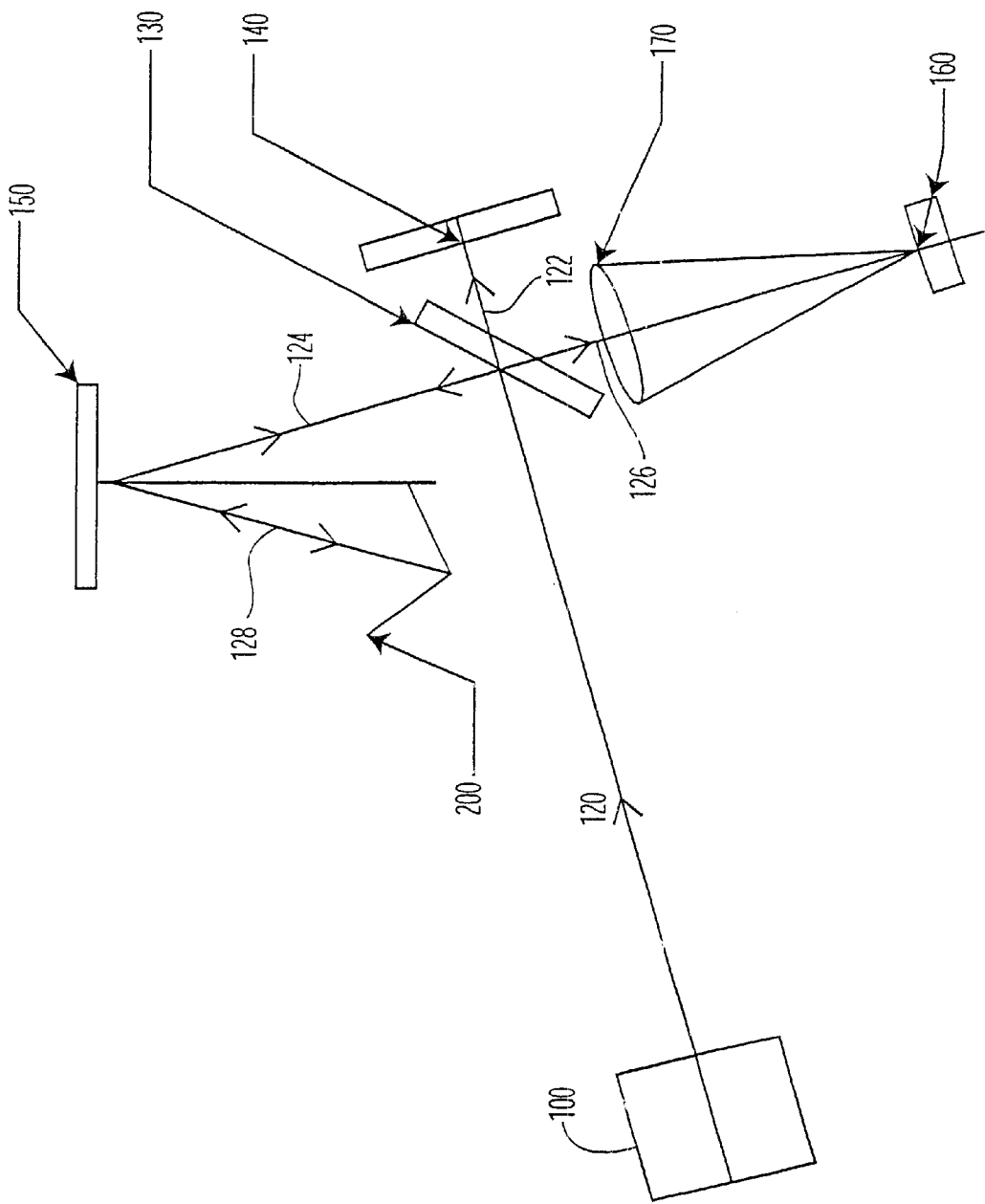
FIG. 2 shows a preferred embodiment of the layout of components of the present invention.

Turning now to FIG. 2, an interferometer made in accordance with the subject invention is shown. The interferometer has a radiation source 100 which sends a single radiation beam 120 towards beamsplitter 130 which is situated at an angle to a fixed mirror 140 and is situated at some unknown angle to a movable mirror, or flat under test, 150. [In fact, an additional advantage of the subject invention (over and above the advantages discussed below in this specification), is that the orientation between beamsplitter 130 and fixed mirror 140, is essentially irrelevant to the accuracy of the results achieved from use of this assembly.] Radiation 120 is partially reflected toward fixed mirror 140 in the form of radiation beam 122, and is partially translated through beamsplitter 130 towards movable mirror 150 as radiation beam 124. Beam 122 is then reflected off of fixed mirror 140, back towards beamsplitter 130, where it is once again partially split, sending some radiation 125 back towards source 100, and some radiation 126 toward detector 160.

Regarding beam 124, however, once split by beamsplitter 130, beam 124 is sent to reflect off of flat under test 150. Since as seen in FIG. 2, flat under test 150 is not perpendicularly situated to incoming beam 124', beam 124 reflects off of flat under test 150 as beam 128 toward retroreflector 200. Beam 128 then is reflected back upon itself by retroreflector 200 to travel an identical, yet opposite path as that of beam 124.

Since a retroreflector functions to reflect an incident beam back towards the source of the incident beam, in a beam parallel to the incident beam, the orientation of flat under test 150 is of no concern, and a fringe effect will automatically appear at detector 160. In short, the need to align flat under test 40 of the Fizeau interferometer of FIG. 1 with reference flat 30, is done away with, as these two alignments are only needed so that the beams reflecting off of flat under test 40 in the Fizeau interferometer reflect in such a way as to cause an interference pattern with the beams reflecting off of reference flat 30 of the Fizeau interferometer. By use of retroreflector 200 in the subject invention, which retroreflector automatically and without the need for alignment, sends beam 128 back in a substantially identical parallel path to that traveled by beam 124, the need for alignment is removed.

Beam 124 then passes back through beamsplitter 130, sending part of its beam back toward source 100 and part toward detector 160. Detector 160 measures the interference between the two radiation beams emanating from the single radiation source. These beams have, through translation and reflection, traveled different optical path lengths, which creates the fringe effect which is visible and measurable to detector 160.

Turning back now and recapping some of the function and structure of the structure shown in FIGS. 2, light source 100 is assumed to include a lens system that first widens the diameter of the emitted beam, and also collimates the beam, as collimating lens 20 did for the Fizeau interferometer of FIG. 1.

Further, as seen in FIG. 2, a convergent lens 170 is shown. This lens reverses the collimation effect of the earlier lens which was part of light source 100, so as to focus beam 126 for processing by detector 160.

Figure 5:
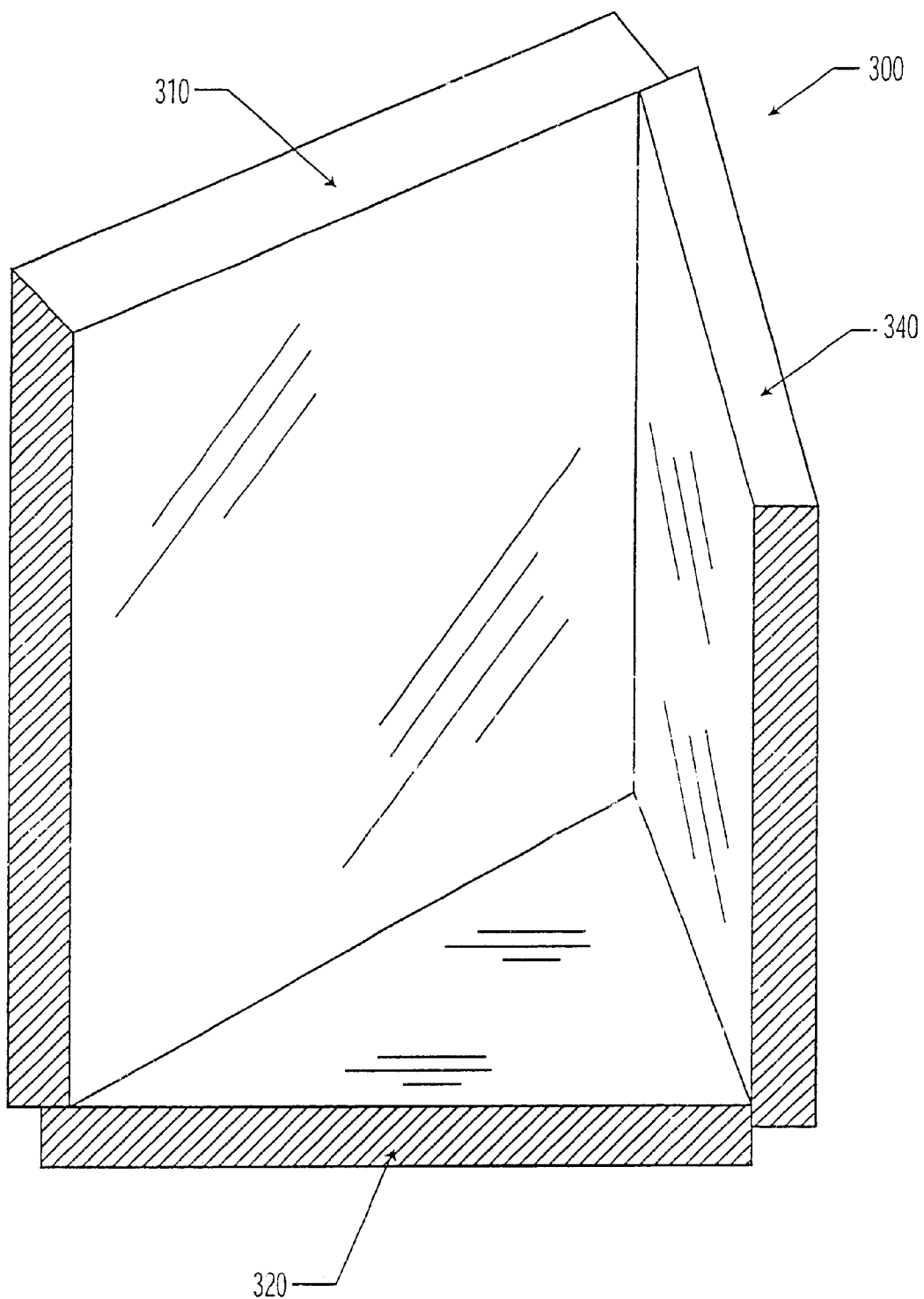
FIG. 5 is a perspective view of a retroreflector/beamsplitter combination.

It is also to be understood that a combination of beamsplitter 130 and reference flat 140 can be used, as best shown in FIG. 5, as element 300. Such a structure was disclosed and discussed in U.S. Pat. No. 5,959,543, to Bleier et. al. in FIG. 8 of that patent. Structure 300 is essentially a retroreflector, but having a beamsplitter panel 310 as one of its panels. The reference flat of this structure is shown at 340, while a third panel 320 is shown connecting panels 310 and 340 in the manner of a standard retroreflector construction. The only difference between structure 300 and a normal retroreflector is that beamsplitter panel 310 is not perpendicularly oriented to reference flat 340, but is instead oriented at a 45 degree angle.

Figure 3:
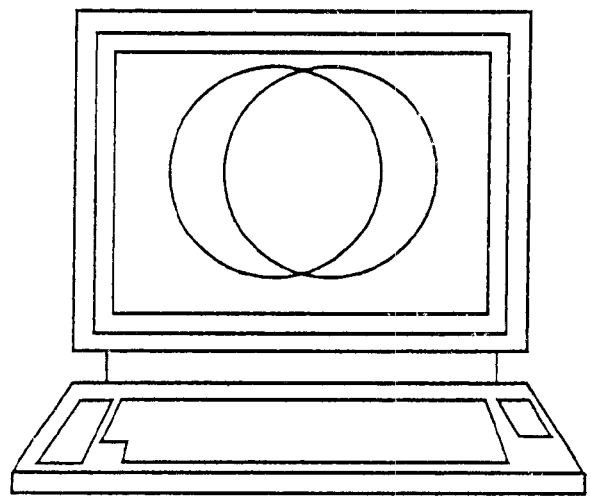
FIG. 3 is a representation on a monitor showing images from a prior art surface profiling apparatus before alignment.
Figure 4:
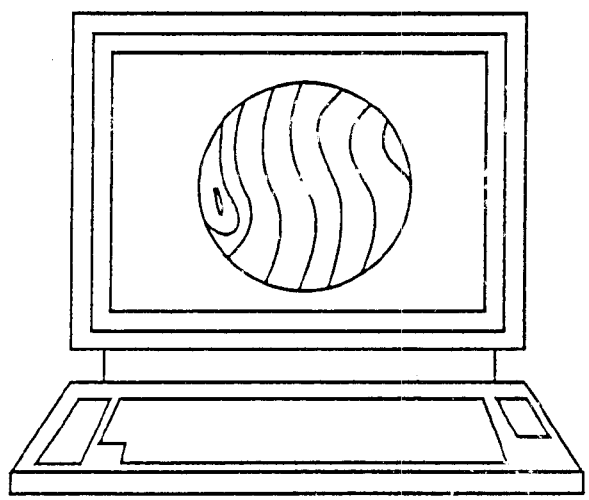
FIG. 4 shows a monitor showing fringes.

Turning to FIGS. 3 and 4, FIG. 3 shows the non-fringe pattern resulting from an unaligned Fizeau interferometer, while FIG. 4 shows an example of a fringe pattern resulting from either an aligned Fizeau interferometer or automatically appearing when the interferometer of the subject invention is used. In both FIGS. 3 and 4, the images are shown on a viewing monitor. Ultimately to perform surface topography, the entire system would need to be hooked up to a computer having installed therein appropriate fringe interpreting topography software and capabilities.

Figure 6:
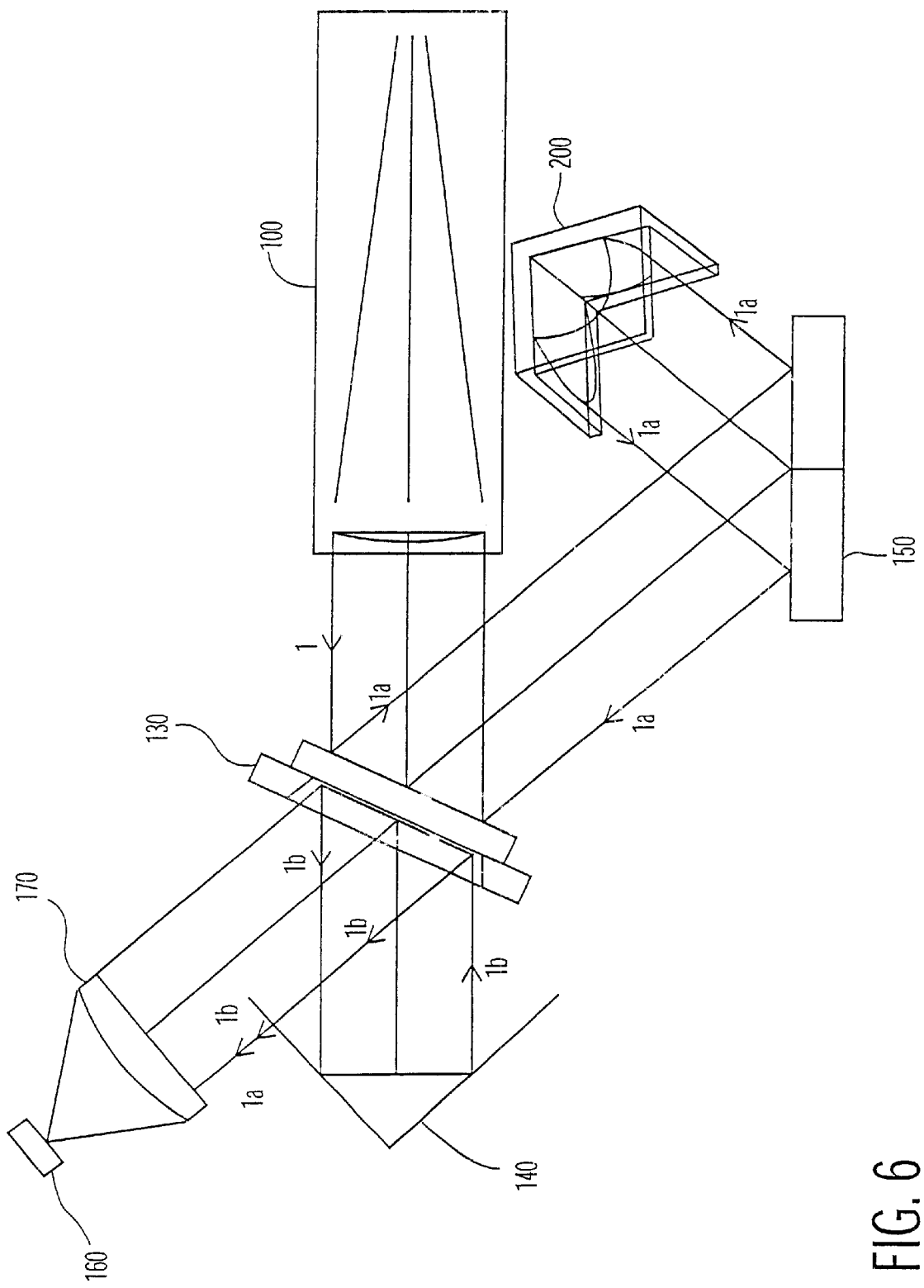
FIG. 6 shows another preferred embodiment of the layout of components of the present invention.

Finally, turning to FIG. 6, the essential assembly of FIG. 2 is repeated, except that substituted for fixed mirror 140 is retroreflector 140'. It is often the case that extremely accurate results are required to be achieved from the subject assembly, but it is also routinely known that such optical assemblies will normally, and inherently, have their own internal errors stemming solely from the optics of the assembly itself; i.e., asymmetrical wavefront errors. To resolve such inherent errors, the subject invention also anticipates the use of second retroreflector 140'.

The purpose of substituting retroreflector 140' for mirror 140 is to ensure that any one particular ray of radiation (each ray within the overall beams 120, 122, 124, 128 and 126), is superimposed upon itself as it travels through the assembly. For example, and referring to FIG. 6, it is seen that ray 1 is split by beamsplitter 130, creating rays 1a and 1b. While it appears that these rays travel along different optical paths, in fact, if one carefully follows either ray it is observed that rays 1a and 1b actually end up being the "same" ray. In this way, ray 1 is fully superimposed upon only itself, and thereby interferes with itself at detector 160, allowing for no inverted imagery (as is normally the case when a flat mirror 140 is used). Accordingly, the optical path of every ray is not subject to internal optics errors, thereby creating a higher accuracy interferometer that is also alignment free, and a fringe pattern representative of the surface under test is best produced.

Further, the invention anticipates that retroreflector 200 of FIGS. 2 or 6, shall be moveable, so as to correct for differences in the thicknesses of different flats under test 150. For example, a phenomenon called sheering occurs when part of the beam reflecting off of the flat under test does not hit the retroreflector so as to be in the clear aperture of the retroreflector (some of the beam hits the retroreflector, while part of the beam misses the retroreflector). This can occur when the thickness of sequentially tested flats under test are sufficiently different (i.e., the actual reflecting surface being tested for flatness for any one flat under test is axially displaced with respect to the other components of the assembly, based upon the thickness of that particular flat under test, as compared to the thickness of other flats under test).

The way the invention meets and resolves this phenomenon is to allow retroreflector 200 to move relative to the optical (axial) path to compensate for these varying thicknesses in the flats under test.

It will thus be seen that the objects set forth above, among those made apparent from the proceeding description, are efficiently obtained, and, since certain changes may be made in the above constructions without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall there between.

What is claimed is:

1. An interferometer assembly, comprising:
    a radiation source for emitting a beam along a first path;
    a beamsplitter in said first path of said beam to split said beam into a reflected beam and a translated beam, said translated beam proceeding substantially along said first path of said beam to a reference mirror, and said reflected beam proceeding along a second path toward a test surface;
    a retroreflector positioned in reflective relation with said second path of said reflected beam, to receive from said test surface said reflected beam, said reflected beam then being reflected from said retroreflector back to said test surface and through said beamsplitter along a third path; and
    a detection system in reflective relation with said paths of said translated beam and said reflected beam, to receive said translated beam after it has reflected off of said reference mirror and back off of said beamsplitter along a fourth path, and to receive said reflected beam after it comes from said test surface through said beamsplitter along said third path;
    wherein receipt of said third path of said reflected beam and said fourth path of said translated beam by said detection system creates an interference pattern viewable to a user of said interferometer assembly, without the need of aligning said test surface.

2. An interferometer assembly as recited in claim 1, further comprising a lens system in said first path of said beam, before said beamsplitter, for manipulating and directing said beam.

3. An interferometer assembly as recited in claim 2, said lens system comprising a collimating lens and a lens for enlarging a diameter of said beam.

4. An interferometer assembly as recited in claim 1, said detection system comprising a convergent lens and a monitor for viewing said interference pattern.

5. An interferometer assembly as recited in claim 1, said retroreflector being selectively moveable in relation to an optical path of said beam received from said test surface.

6. An interferometer assembly, comprising:
    a radiation source for emitting a beam along a first path;
    a first retroreflector assembly, comprising:
        a beamsplitter panel in said first path of said beam;
        a reflecting panel having a reflecting surface in reflecting relation with said beamsplitter panel; and
        a support panel having a receiving surface;
        wherein each of said panels has a side at substantially a right angle to said surface of said panel, and wherein each of said panels is abutting and joined along said side to said surface of said panel immediately adjacent to said side, and further wherein said beam passes through said beamsplitter panel and is split into a reflected beam and a translated beam, said translated beam proceeding substantially along said first path of said beam to said reflecting surface of said reflecting panel, and said reflected beam proceeding along a second path toward a test surface;
    a second retroreflector positioned in reflective relation with said second path of said reflected beam, to receive from said test surface said reflected beam, said reflected beam then being reflected from said second retroreflector back to said test surface and through said beamsplitter panel along a third path; and
    a detection system in reflective relation with said paths of said translated beam and said reflected beam, to receive said translated beam after it has reflected off of said reflecting surface of said reflecting panel and back off of said beamsplitter panel along a fourth path, and to receive said reflected beam after it comes from said test surface through said beamsplitter panel along said third path;
    wherein receipt of said third path of said reflected beam and said fourth path of said translated beam by said detection system creates an interference pattern viewable to a user of said interferometer assembly, without the need of aligning said test surface.

7. An interferometer assembly as recited in claim 6, further comprising a lens system in said first path of said beam, before said retroreflector assembly, for manipulating and directing said beam.

8. An interferometer assembly as recited in claim 7, said lens system comprising a collimating lens and a lens for enlarging a diameter of said beam.

9. An interferometer assembly as recited in claim 6, said detection system comprising a convergent lens and a monitor for viewing said interference pattern.

10. An interferometer assembly as recited in claim 6, said second retroreflector being selectively moveable in relation to an optical path of said beam received from said test surface.

11. An interferometer assembly, comprising:
a radiation source for emitting a beam along a first path;
a beamsplitter in said first path of said beam to split said beam into a reflected beam and a translated beam, said translated beam proceeding substantially along said first path of said beam to a first retroreflector, and said reflected beam proceeding along a second path toward a test surface;
a second retroreflector positioned in reflective relation with said second path of said reflected beam, to receive from said test surface said reflected beam, said reflected beam then being reflected from said second retroreflector back to said test surface and through said beamsplitter along a third path; and
a detection system in reflective relation with said paths of said translated beam and said reflected beam, to receive said translated beam after it has reflected off of said first retroreflector and back off of said beamsplitter along a fourth path, and to receive said reflected beam after it comes from said test surface through said beamsplitter along said third path;
wherein receipt of said third path of said reflected beam and said fourth path of said translated beam by said detection system creates an interference pattern viewable to a user of said interferometer assembly, without the need of aligning said test surface.

12. An interferometer assembly as recited in claim 11, further comprising a lens system in said first path of said beam, before said beamsplitter, for manipulating and directing said beam.

13. An interferometer assembly as recited in claim 12, said lens system comprising a collimating lens and a lens for enlarging a diameter of said beam.

14. An interferometer assembly as recited in claim 11, said detection system comprising a convergent lens and a monitor for viewing said interference pattern.

15. An interferometer assembly as recited in claim 11, said second retroreflector being selectively moveable in relation to an optical path of said beam received from said test surface.

16. An interferometer assembly, comprising:
a radiation source for emitting a beam along a first path;
a beamsplitter in said first path of said beam to split said beam into a reflected beam and a translated beam, said translated beam proceeding substantially along said first path of said beam to a reference mirror, and said reflected beam proceeding along a second path toward a test surface;
a retroreflector positioned in reflective relation with said second path of said reflected beam along an optical path of said reflected beam, said retroreflector being selectively moveable in relation to said optical path, to receive from said test surface said reflected beam, said reflected beam then being reflected from said retroreflector back to said test surface and through said beamsplitter along a third path; and
a detection system in reflective relation with said paths of said translated beam and said reflected beam, to receive said translated beam after it has reflected off of said reference mirror and back off of said beamsplitter along a fourth path, and to receive said reflected beam after it comes from said test surface through said beamsplitter along said third path;
wherein receipt of said third path of said reflected beam and said fourth path of said translated beam by said detection system creates an interference pattern viewable to a user of said interferometer assembly, without the need of aligning said test surface.

17. An interferometer assembly as recited in claim 16, further comprising a lens system in said first path of said beam, before said beamsplitter, for manipulating and directing said beam.

18. An interferometer assembly as recited in claim 17, said lens system comprising a collimating lens and a lens for enlarging a diameter of said beam.

19. An interferometer assembly as recited in claim 16, said detection system comprising a convergent lens and a monitor for viewing said interference pattern.

20. An interferometer assembly, comprising:
a radiation source for emitting a beam along a first path;
a first retroreflector assembly, comprising:
a beamsplitter panel in said first path of said beam;
a reflecting panel having a reflecting surface in reflecting relation with said beamsplitter panel; and
a support panel having a receiving surface;
wherein each of said panels has a side at substantially a right angle to said surface of said panel, and wherein each of said panels is abutting and joined along said side to said surface of said panel immediately adjacent to said side, and further wherein said beam passes through said beamsplitter panel and is split into a reflected beam and a translated beam, said translated beam proceeding substantially along said first path of said beam to said reflecting surface of said reflecting panel, and said reflected beam proceeding along a second path toward a test surface;
a second retroreflector positioned in reflective relation with said second path of said reflected beam along an optical path of said reflected beam, said second retroreflector being selectively moveable in relation to said optical path, to receive from said test surface said reflected beam, said reflected beam then being reflected from said second retroreflector back to said test surface and through said beamsplitter panel along a third path; and
a detection system in reflective relation with said paths of said translated beam and said reflected beam, to receive said translated beam after it has reflected off of said reflecting surface of said reflecting panel and back off of said beamsplitter panel along a fourth path, and to receive said reflected beam after it comes from said test surface through said beamsplitter panel along said third path;
wherein receipt of said third path of said reflected beam and said fourth path of said translated beam by said detection system creates an interference pattern viewable to a user of said interferometer assembly, without the need of aligning said test surface.

21. An interferometer assembly as recited in claim 20, further comprising a lens system in said first path of said beam, before said first retroreflector assembly, for manipulating and directing said beam.

22. An interferometer assembly as recited in claim 21, said lens system comprising a collimating lens and a lens for enlarging a diameter of said beam.

23. An interferometer assembly as recited in claim 20, said detection system comprising a convergent lens and a monitor for viewing said interference pattern.

24. An interferometer assembly, comprising:
a radiation source for emitting a beam along a first path;
a beamsplitter in said first path of said beam to split said beam into a reflected beam and a translated beam, said translated beam proceeding substantially along said first path of said beam to a first retroreflector, and said reflected beam proceeding along a second path toward a test surface;
a second retroreflector positioned in reflective relation with said second path of said reflected beam along an optical path of said reflected beam, said second retroreflector being selectively moveable in relation to said optical path, to receive from said test surface said reflected beam, said reflected beam then being reflected from said second retroreflector back to said test surface and through said beamsplitter along a third path; and
a detection system in reflective relation with said paths of said translated beam and said reflected beam, to receive said translated beam after it has reflected off of said first retroreflector and back off of said beamsplitter along a fourth path, and to receive said reflected beam after it comes from said test surface through said beamsplitter along said third path;
wherein receipt of said third path of said reflected beam and said fourth path of said translated beam by said detection system creates an interference pattern viewable to a user of said interferometer assembly, without the need of aligning said test surface.

25. An interferometer assembly as recited in claim 24, further comprising a lens system in said first path of said beam, before said beamsplitter, for manipulating and directing said beam.

26. An interferometer assembly as recited in claim 25, said lens system comprising a collimating lens and a lens for enlarging a diameter of said beam.

27. An interferometer assembly as recited in claim 24, said detection system comprising a convergent lens and a monitor for viewing said interference pattern.

28. A method of profiling an object surface using an alignment-free interferometer, comprising the steps of:
directing a beam from a radiation source along a first path towards a beamsplitter;
dividing said beam at said beamsplitter into a translated beam passing through said beamsplitter along a path substantially equivalent to said first path of said beam and toward a reference mirror, and into a reflected beam traveling along a second path toward said object surface;
reflecting said reflected beam off of said object surface to a retroreflector, and then along a third path substantially parallel to said second path back off of said object surface and through said beamsplitter;
reflecting said translated beam off of said reference mirror along a fourth path toward said beamsplitter; and
recombining said reflected beam traveling along said third path from said beamsplitter and said translated beam traveling along said fourth path also from said beamsplitter, to form an interference pattern representative of said surface profile of said object surface.

29. A method of profiling an object surface using an alignment-free interferometer as recited in claim 28, further comprising the first step of directing said beam through a lens system, and then towards said beamsplitter.

30. A method of profiling an object surface using an alignment-free interferometer as recited in claim 29, said lens system comprising a collimating lens and a lens for enlarging a diameter of said beam.

31. A method of profiling an object surface using an alignment-free interferometer as recited in claim 28, said recombining step taking place in a detection system.

32. A method of profiling an object surface using an alignment-free interferometer as recited in claim 31, said detection system comprising a convergent lens and a monitor for viewing said interference pattern.

33. A method of profiling an object surface using an alignment-free interferometer, comprising the steps of:
directing a beam from a radiation source along a first path towards a first retroreflector assembly, said first retroreflector assembly comprising a beamsplitter panel in said first path of said beam, a reflecting panel having a reflecting surface in reflecting relation with said beamsplitter panel, and a support panel having a receiving surface, wherein each of said panels has a side at substantially a right angle to said surface of said panel, and wherein each of said panels is abutting and joined along said side to said surface of said panel immediately adjacent to said side, and further wherein said directing step directs said beam through said beamsplitter panel of said first retroreflector;
dividing said beam at said beamsplitter panel into a translated beam passing through said beamsplitter panel along a path substantially equivalent to said first path of said beam and toward said reflecting surface of said reflecting panel, and into a reflected beam traveling along a second path toward said object surface;
reflecting said reflected beam off of said object surface to a second retroreflector, and then along a third path substantially parallel to said second path back off of said object surface and through said beamsplitter panel;
reflecting said translated beam off of said reflecting surface of said reflecting panel along a fourth path toward said beamsplitter panel; and
recombining said reflected beam traveling along said third path from said beamsplitter and said translated beam traveling along said fourth path also from said beamsplitter, to form an interference pattern representative of said surface profile of said object surface.

34. A method of profiling an object surface using an alignment-free interferometer as recited in claim 33, further comprising the first step of directing said beam through a lens system, and then towards said first retroreflector assembly.

35. A method of profiling an object surface using an alignment-free interferometer as recited in claim 34, said lens system comprising a collimating lens and a lens for enlarging a diameter of said beam.

36. A method of profiling an object surface using an alignment-free interferometer as recited in claim 33, said recombining step taking place in a detection system.

37. A method of profiling an object surface using an alignment-free interferometer as recited in claim 36, said detection system comprising a convergent lens and a monitor for viewing said interference pattern.

38. A method of profiling an object surface using an alignment-free interferometer, comprising the steps of:

directing a beam from a radiation source along a first path towards a beamsplitter;

dividing said beam at said beamsplitter into a translated beam passing through said beamsplitter along a path substantially equivalent to said first path of said beam and toward a first retroreflector, and into a reflected beam traveling along a second path toward said object surface;

reflecting said reflected beam off of said object surface to a second retroreflector, and then along a third path substantially parallel to said second path back off of said object surface and through said beamsplitter;

reflecting said translated beam off of said first retroreflector along a fourth path toward said beamsplitter; and recombining said reflected beam traveling along said third path from said beamsplitter and said translated beam traveling along said fourth path also from said beamsplitter, to form an interference pattern representative of said surface profile of said object surface.

39. A method of profiling an object surface using an alignment-free interferometer as recited in claim 38, further comprising the first step of directing said beam through a lens system, and then towards said beamsplitter.

40. A method of profiling an object surface using an alignment-free interferometer as recited in claim 39, said lens system comprising a collimating lens and a lens for enlarging a diameter of said beam.

41. A method of profiling an object surface using an alignment-free interferometer as recited in claim 38, said recombining step taking place in a detection system.

42. A method of profiling an object surface using an alignment-free interferometer as recited in claim 41, said detection system comprising a convergent lens and a monitor for viewing said interference pattern.

* * * * *